(12) United States Patent
Lin et al.

(10) Patent No.: US 6,360,953 B1
(45) Date of Patent: *Mar. 26, 2002

(54) SECURE PRINT SENSING SMART CARD WITH ON-THE-FLY-OPERATION

(75) Inventors: Fong-Jei Lin, Saratoga; Shengbo Zhu, San Jose, both of CA (US)

(73) Assignee: Magnex Corporation, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,728

(22) Filed: Jul. 15, 1998

(51) Int. Cl.[7] ............................................... G06K 19/06

(52) U.S. Cl. ....................................... 235/492; 235/380

(58) Field of Search ................................ 235/379, 380, 235/382, 382.5, 375, 492, 487

(56) References Cited

U.S. PATENT DOCUMENTS 5,180,901 A * 1/1993 Hiramatsu .................. 235/380
5,815,252 A * 9/1998 Price-Francis .......... 235/492 X
5,952,641 A * 9/1999 Korshun ..................... 235/382

* cited by examiner

*Primary Examiner*—Karl D. Frech

(57) ABSTRACT

A smart card for use in conjunction with a security portal, such as a transit turnstile, a residential access gate, or a parking facility, for performing authentication checks for authorized passage. A print sensor is positioned on each major surface of the card in positions conforming to the natural placement of the thumb and a finger. The print sensors generate print pattern signals which are checked against authentic versions stored in non-volatile memory in the card, using a processor located within the card. The result of the authentication check is communicated to the associated external security portal by an r.f. circuit, which also receives r.f. energy from the external device to provide D.C. power for the circuits internal to the card. The card can be used on-the-fly without the need to stop at the check point, thereby facilitating traffic flow through the check point.

4 Claims, 3 Drawing Sheets

SECURE PRINT SENSING SMART CARD WITH ON-THE-FLY-OPERATION

BACKGROUND OF THE INVENTION

This invention relates to smart cards in general, and in particular to an improved smart card architecture with improved operational capability.

Smart cards are currently known and generally comprise a card-shaped data token having active system elements incorporated within the card structure for enabling interactive use of the card with a wide variety of data processing systems, such as credit card charging systems which enable point-of-sale purchase transactions, debit card systems, fare collection systems for public transportation, secure access facilities, and any application which requires a data token capable of interacting with a data processing system. Smart cards have two basic configurations-one requiring direct, positive contact with the card reading device (such as those cards using ohmic contacts), and another requiring only proximity to the card reading device(such as those cards using inductive or capacitive transfer elements). Both configurations typically incorporate within the physical card structure several basic elements required for a properly functioning device. These elements include an input/output data transfer circuit, a local data processor, some type of non-volatile memory for storing data within the card between periods of active use and for storing some form of program to enable the card to function with the external data processing system, and a power transfer circuit. For direct contact smart cards, the input/output data transfer circuit and the power transfer circuit typically employ ohmic contacts which enable DC power supplied by the card reader unit to be transferred to the elements within the card and provide a data transfer path. For contactless smart cards, the input/output data transfer circuit and the power transfer circuit typically employ an r.f. energy receiving circuit, which includes circuitry for converting energy received from an outside source in r.f. form to usable DC form. The r.f. energy receiving circuit typically includes an inductor which is also used to provide a data transfer path. A survey of present smart card technology is set forth in a publication entitled "About Smart Cards" available from Racom Systems, Inc. The disclosure of this publication is hereby incorporated by reference. Smart cards have been proposed which incorporate an authentication mechanism for preventing use of the card by all but the authorized user. The most secure authentication mechanism proposed to date employs a print reader and associated circuitry within the card itself which can read the unique fingerprint or the thumbprint of the user, compare the read print with a stored version known to be genuine, and permit use of the card for a transaction if the two versions match. A description of such a secure smart card can be found in U.S. Pat. No. 5,473,144 issued Dec. 5, 1995 for "CREDIT CARD WITH DIGITIZED FINGER PRINT AND READING APPARATUS" and U.S. Pat. No. 5,180,901 for "IC CARD WITH INDIVIDUAL AUTHENTICATION FUNCTION", the disclosures of which are hereby incorporated by reference In known smart cards of this type using direct contact between the card and the reader apparatus, the card must be inserted into a slot (such as slot 18 in the '144 device) and the finger or thumb of the user must be pressed against a support surface (such as scanning screen 20 in the '144 device) in order to perform the authentication procedure. In the smart card apparatus shown in the '901 patent, which also appears to employ direct contact, the card must be placed on a firm support surface in order to permit the user's finger to press firmly against the fingerprint sensor areas 1 and 3 in order to permit the authentication process to proceed correctly.

While the above arrangements are well-suited for direct contact applications, which inherently require that the smart card remain stationary for some period of time in the card reader, problems are encountered when this arrangement is attempted to be applied to contactless smart cards. The primary advantage of a contactless smart card lies in the fact that the card may be read on-the-fly without the need for the user to stop at the card reader station, insert the card into a card reader, wait for the authentication procedure to complete, and then withdraw the card from the reader. Rather, in a contactless card installation, the user merely places the card in the proximity of the reader, typically while continuing to advance in the direction of the secured portal (e.g. a transit system turnstile, or an automatic security gate or door), and the authentication process proceeds while the user advances. If the authorization process is successful, the user passes through the secured portal without the need to pause during the process. This advantage is especially significant in high traffic applications, in which the desired result is a combination of secured access and continuous traffic flow at the normal rate. Known smart card systems which employ fingerprint verification do afford a high degree of secure access: however, such systems suffer from the disadvantage of requiring a pause in the flow of traffic while the user's print is being checked for authenticity.

SUMMARY OF THE INVENTION

The invention comprises a smart card which incorporates print verification into a physical card structure which allows the user's personal print to be read without the need for any stationary reading surface element so that the card may be used on-the-fly to control access to a secure portal.

In a broadest aspect, the invention comprises a physical card structure having a print registration area located on a surface of the card, means for enabling the user to grip the card to press the finger or thumb print into enabling registration with the print registration area, and electronic circuitry located within the card for converting the physical print information presented to the print registration area into electric print signals for performing an authenticity check of the user's personal print.

The enabling means preferably comprises sensor portions on the card surface which are positioned in locations at which the print portions of the thumb or finger are naturally located when the card is gripped by the user so that firm contact is automatically established and reliable signals can be generated whenever the user grasps the card in the proper manner.

The electronic circuitry comprises circuit components for performing the print authentication check process entirely within the card itself and for transmitting a pass/no-pass signal to the security check point. The circuitry includes a non-volatile memory for storing authentic versions of the prints of the authorized user, and a processor for comparing these known versions with current print signals generated by the print sensor. An r.f. transfer circuit provides a data transfer path between the card and any external device, and also enables the transfer of r.f. energy from an external source to the circuit elements within the card.

The invention affords the relatively high security associated with personal print verification without impeding traffic flow through the security check point.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
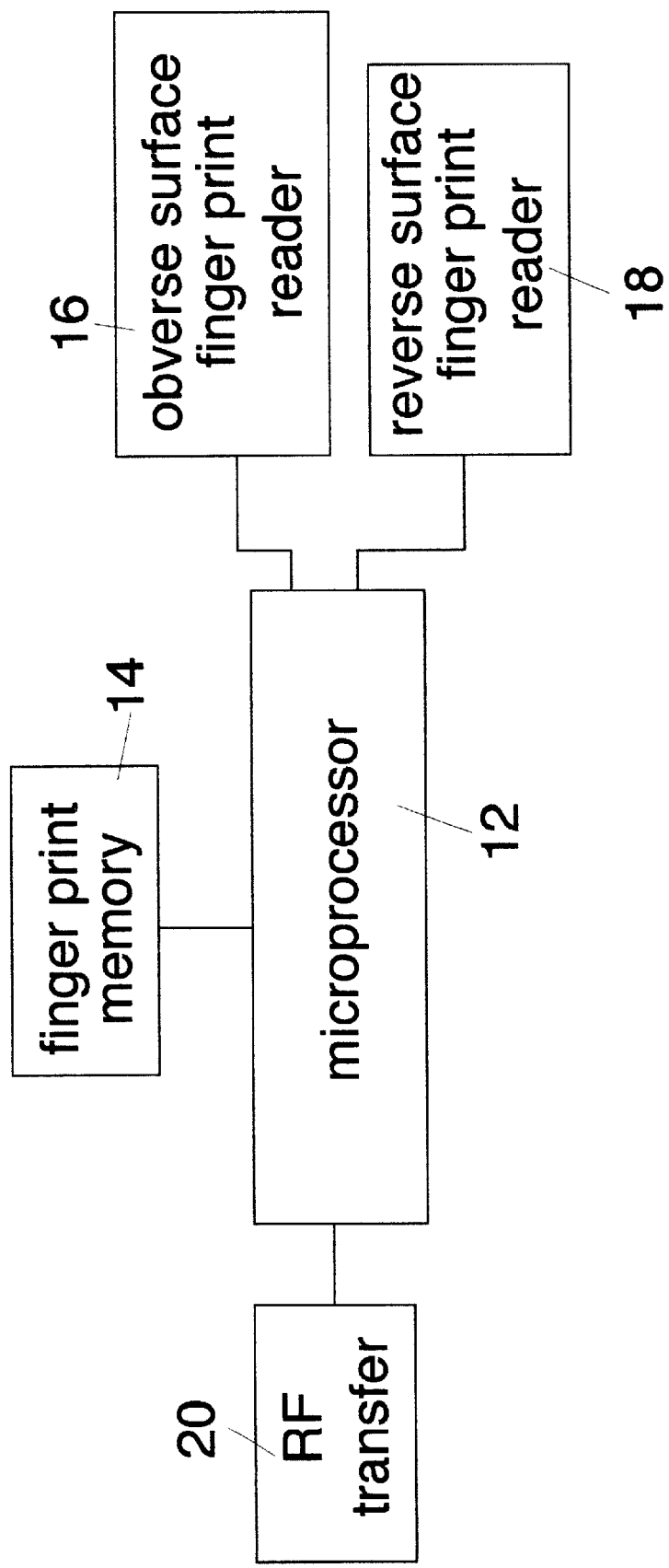
FIG. 1 is a block diagram of a contactless transfer smart card incorporating the invention.

Turning now to the drawings, FIG. 1 is a block diagram of a contactless transfer smart card incorporating the invention. As seen in this Fig., the smart card includes a microprocessor 12, a finger print memory 14, an obverse surface finger print reader 16, a reverse surface finger print reader 18, and an r.f. transfer circuit 20. Microprocessor 12 may comprise any one of a number of commercially available microprocessors capable of providing the control and data processing functions required by the smart card and described below, such as an embedded processor from the PIC family of such devices available from Microchip Technology, Inc of Chandler, Ariz. Finger print memory 14 comprises a non-volatile storage unit of sufficient memory capacity to permanently store digital versions of one or more personal prints of the authorized user, preferably a thumb print and one finger print (the index finger print of the same hand as the thumb print is especially preferred). Known types of non-volatile storage devices suitable for use as finger print memory 14 include flash memory, PROM, EEPROM, and the magnetic memory unit disclosed in U.S. Pat. No. 5,126,971 for "Thin Film Magnetic Core Memory And Method Of Making Same" issued Jun. 30, 1992, the disclosure of which is hereby incorporated by reference.

Finger print readers 16 and 18 may comprise any form of print reader device capable of generating electrical signals representative of the personal print pattern of the user's finger or thumb when that portion of the finger or thumb is pressed firmly against the part of the smart card surface at which the print reader is located. These electrical signals usually specify a unique pattern of ridges and valleys found on the fleshy part of the finger or thumb between the tip and the first joint, and this pattern is a highly reliable indicator of authenticity. Readers 16 and 18 may incorporate the principles disclosed in the two above-referenced '144 and '901 patents or may comprise other known equivalent devices capable of generating the required pattern signals from finger or thumb pressure alone.

R.f. transfer circuit 20 provides both energy and data transfer between the internal smart card elements and external devices, and typically includes an inductive loop for sensing energy and data supplied from these external devices, and circuitry for handling or processing the energy and data signals in appropriate fashion. Such circuitry is well-known in the art and normally includes circuits for separating r.f. energy and data signals, and circuitry for buffering data in both the incoming and outgoing directions.

Figure 3:
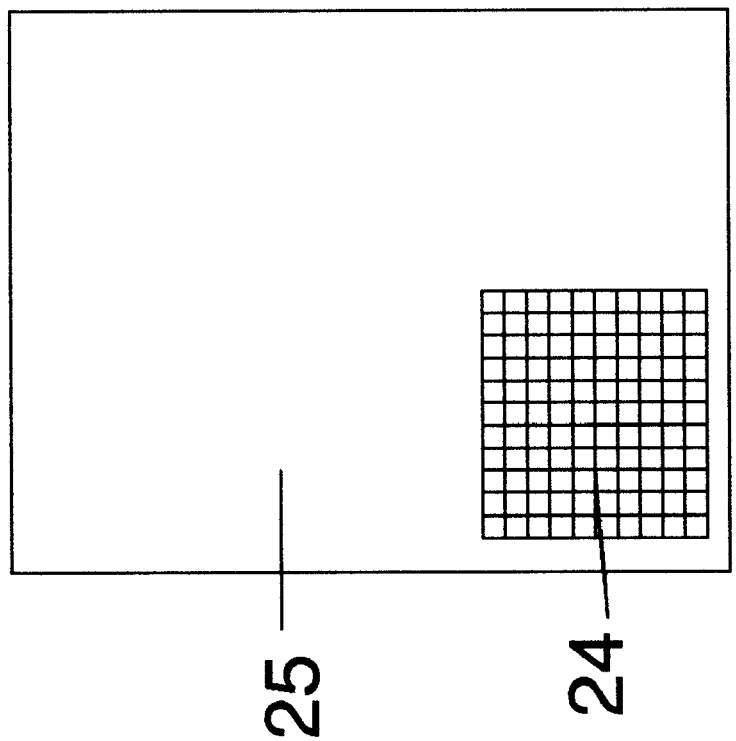
FIG. 3 is a view of the reverse card surface of a smart card incorporating the invention.
Figure 2:
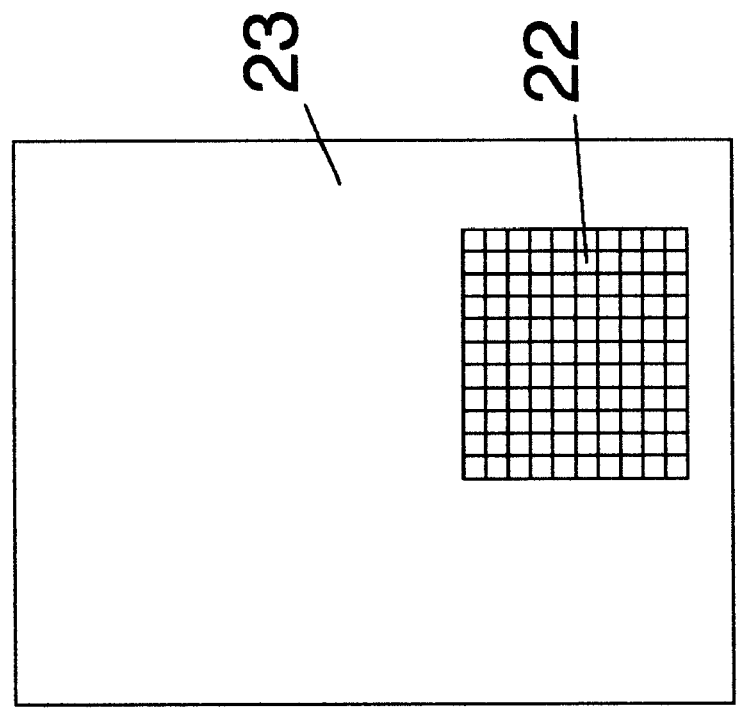
FIG. 2 is a view of a first card surface showing the print registration area of a smart card incorporating the invention.
Figure 5:
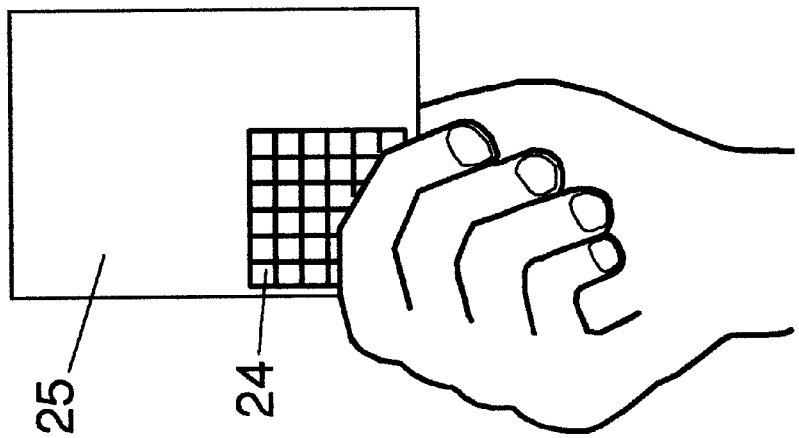
FIGS. 4–5 are schematic views illustrating the interaction between the thumb and finger of a user and the print sensor.
Figure 4:
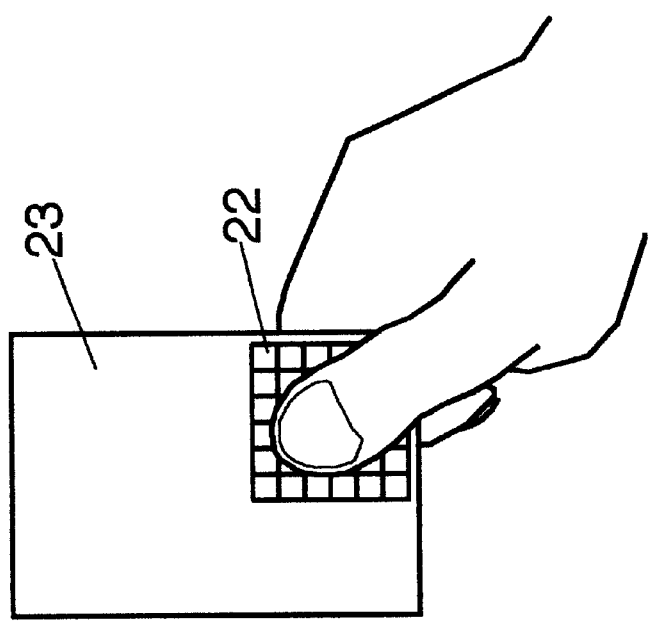

FIGS. 2 and 3 illustrate, respectively, the obverse surface and the reverse surface of the smart card, and the preferred location of the print sensor regions on each surface in the preferred embodiment of the invention. With reference to FIG. 2, the print sensor region 22 on obverse surface 23 of the smart card is positioned in approximately the lower right quadrant of obverse surface 23 in a location at which the print portion of the user's thumb will make firm contact when the card is grasped by the user (depicted in FIG. 4). With reference to FIG. 3, the print sensor region 24 on reverse surface 25 of the smart card is positioned in approximately the lower left quadrant of reverse surface 25 in a location at which the print portion of the user's finger will make firm contact when the card is grasped by the user (depicted in FIG. 5). Due to this placement of the print sensor regions, the thumb and finger prints are firmly placed in operational contact with the print sensor regions whenever the card is firmly grasped by the user. As a consequence, the card can be used on-the-fly without the need for any support platform as required by prior art devices.

In use, the smart card is prepared by loading the authorized user's print or prints into finger print memory 14. This is typically done at some authorization station, such as a branch office of the card issuer (e.g., a bank, a security office of a parking facility, an airline travel office, the administrative office of a controlled access community, a ticket purchase facility of a transit agency, or the like). Once the personal print(s) are permanently stored in memory 14, the card can be used in association with the security check points of the corresponding controlled access system. At each such check point, an external station is provided which incorporates the necessary electronic and mechanical elements for implementing the security access control. The external device interacts with the smart card in two ways: first, by providing a source of r.f. energy to energize the smart card electronics; second, by receiving access permitted/access denied signals from the smart card. The authentication check is performed within the card itself by means of an authentication algorithm used by the microprocessor 12. If the result of the authentication check performed by the microprocessor indicates that the card is being carried by the authorized user, the microprocessor issues an access permitted signal, which is transmitted via r.f. transfer circuit 20 to the external station. Upon receipt of this signal by the external station, the station executes the necessary control functions to permit the user to gain access. Otherwise, access is denied.

While the essentially flat card surface topography illustrated in FIGS. 2–5 is preferred for reasons of economy and simplicity, it is understood that other surface topographies may be employed, as desired. For example, the card body may be fabricated as a three dimensional token with substantial thickness, with contoured portions on one or both major surfaces to form a natural nesting area for the thumb or finger.

As will now be apparent, smart cards fabricated according to the teachings of the invention provide the twin advantages of relatively high security afforded by the print authentication technique and unimpeded flow of traffic through the controlled area. As will be apparent to those skilled in the art, the invention can be used in a wide variety of applications requiring the capability of smart card technology. The invention is especially useful in those applications involving the need for unimpeded flow of traffic, such as transit system fare collection installations, airport security check points, motor vehicle toll collection booths, gated access to a residential community and any application in which the need for a measure of security is combined with the requirement for smooth flow of vehicles or individuals. The invention may be configured for access control alone, or for access control in combination with fare collection, as in a transit system or toll gate application.

The invention may be configured for right-handed use as illustrated, for left-handed use, and for single or dual print authentication. For example, for single print authentication only one print sensor region 22 or 24 is incorporated into the smart card and a single corresponding set of authentic print signals is stored in memory 14. In addition, the invention may be configured for both right or left handed use. In such an application, the print sensor regions 22, 24 are positioned in the approximate center of the lower portion of the card so that either a right hand or left hand thumb and/or forefinger print can be registered.

Although the above provides a full and complete disclosure of the preferred embodiments of the invention, various modifications, alternate constructions and equivalents will occur to those skilled in the art. For example, while specific examples for microprocessor 12, finger print memory 14, and print sensors 16, 18 have been described, other device types may be selected, as desired. Therefore, the above should not be construed as limiting the invention, which is defined by the appended claims.

What is claimed is:

1. A smart card for use in secure user authentication systems, said card comprising:

a card body having front and back surfaces;

a print sensor carried by said card and having a first portion located on one of said front and back surfaces of said card for providing real-time signals representative of a fingerprint of a user pressed against said first portion of said sensor, and a second portion located on the other one of said front and back surfaces of said card for providing real-time signals representative of a thumbprint of said user pressed against said second portion of said sensor, said first and said second portions being located on said front and said back surfaces of said card in such relative positions whereby said fingerprint and said thumbprint are self-aligned with said first and said second portions when said user grasps said card;

means for enabling said print sensor to provide said signals when said card is grasped by said user and the finger and thumb of said user is placed in contact with said first and second portions of said sensor without the aid of an external support; and authentication means within the card for generating electric authentication signals from said print sensor signals, whereby said real-time signals and said authentication signals can be generated while said card is moving and without any need to support said card with an external support.

2. The invention of claim 1 wherein said authentication means includes a print memory in said card for storing known authentic fingerprint and thumbprint signals, and processor means for comparing said authentic fingerprint and thumbprint signals with said real-time signals.

3. The invention of claim 1 wherein said card further includes an r.f. transfer circuit for receiving r.f. energy from an associated external source and for enabling transfer of data between said card and an external associated device.

4. The invention of claim 1 wherein said authentication means further includes means for generating an access control signal for use in controlling an external access control device.

* * * * *